United States Patent
Smith et al.

(10) Patent No.: US 11,982,521 B2
(45) Date of Patent: May 14, 2024

(54) MEASUREMENT OF A CHANGE IN A GEOMETRICAL CHARACTERISTIC AND/OR POSITION OF A WORKPIECE

(71) Applicant: NIKON CORPORATION, Tokyo (JP)

(72) Inventors: Daniel Gene Smith, Tucson, AZ (US); Michael B. Binnard, Belmont, CA (US)

(73) Assignee: Nikon Corporation (JP)

(*) Notice: Subject to any disclaimer, the term of this patent is extended or adjusted under 35 U.S.C. 154(b) by 630 days.

(21) Appl. No.: 16/487,800

(22) PCT Filed: Feb. 22, 2018

(86) PCT No.: PCT/US2018/019137
§ 371 (c)(1),
(2) Date: Aug. 21, 2019

(87) PCT Pub. No.: WO2018/156702
PCT Pub. Date: Aug. 30, 2018

(65) Prior Publication Data
US 2020/0232786 A1  Jul. 23, 2020

Related U.S. Application Data

(60) Provisional application No. 62/548,178, filed on Aug. 21, 2017, provisional application No. 62/462,489, filed on Feb. 23, 2017.

(51) Int. Cl.
*G01B 11/16* (2006.01)
*G02B 5/18* (2006.01)
(Continued)

(52) U.S. Cl.
CPC .......... *G01B 11/165* (2013.01); *G01B 11/167* (2013.01); *G02B 5/1871* (2013.01); *G02B 27/425* (2013.01); *G02B 27/50* (2013.01)

(58) Field of Classification Search
CPC ............... G01B 11/165; G01B 11/167; G01B 2290/30; G01B 9/02097; G01B 11/161;
(Continued)

(56) References Cited

U.S. PATENT DOCUMENTS 4,251,160 A * 2/1981 Bouwhuis ............. G02B 27/18
356/150
4,322,162 A * 3/1982 McKelvie ............. G01B 11/165
356/35.5
(Continued)

FOREIGN PATENT DOCUMENTS

EP  0498499 B1 * 8/1992 ............... G03F 7/20
KR  100552455 B1 * 2/2006 ........... H01L 21/027
(Continued)

OTHER PUBLICATIONS

Office Action issued in Taiwan Patent Application Serial No. 107106244, by the Taiwan Intellectual Property Office, dated Apr. 7, 2021.
(Continued)

*Primary Examiner* — Mohamed K Amara
(74) *Attorney, Agent, or Firm* — Roeder & Broder LLP; Steven G. Roeder

(57) ABSTRACT

A method for measuring a spatial distortion of a target surface (110) of a workpiece (110A). Light is transmitted twice through a reference pattern-generator (104) and impinged upon a workpiece pattern-generator (108). Then, with an optical detector (116), first and second beams formed by the light as a result of interaction with two pattern-generators (104) (106) is acquired to produce a signal characterizing geometry of interference fringes formed at the detector (116) by the first and second beams. Indicia representing at least one of a type and a value of spatial distortion of the target surface (110) is generated and
(Continued)

recorded. A system embodying the implementation of the method.

24 Claims, 9 Drawing Sheets

(51) Int. Cl.
*G02B 27/42* (2006.01)
*G02B 27/50* (2006.01)

(58) Field of Classification Search
CPC ............ G01B 11/2441; G01B 11/254; G02B 5/1871; G02B 27/425; G02B 27/50; G03F 9/7076; G03F 9/7049; G03F 9/7015; G03F 7/70625; G01D 5/38; G06T 7/521; H01L 22/12
See application file for complete search history.

(56) References Cited

U.S. PATENT DOCUMENTS

| | | | | |
|---|---|---|---|---|
| 4,564,295 A * | 1/1986 | Halioua | | G01B 11/254 250/237 G |
| 4,631,416 A * | 12/1986 | Trutna, Jr. | | G03F 9/7049 250/237 G |
| 4,656,347 A * | 4/1987 | Une | | G03F 9/7023 250/237 G |
| 4,722,600 A | 2/1988 | Chiang | | |
| 4,737,823 A * | 4/1988 | Bouwer | | G03F 7/70241 355/56 |
| 4,778,275 A * | 10/1988 | van den Brink | | G03F 9/7049 356/150 |
| 4,779,001 A * | 10/1988 | Makosch | | G03F 9/7049 250/548 |
| 4,811,062 A * | 3/1989 | Tabata | | G03F 9/7049 250/342 |
| 4,848,911 A * | 7/1989 | Uchida | | G03F 9/7023 257/797 |
| 4,850,693 A * | 7/1989 | Deason | | G01D 5/38 356/521 |
| 5,000,573 A * | 3/1991 | Suzuki | | G03F 7/70633 356/400 |
| 5,004,348 A * | 4/1991 | Magome | | G03F 9/7049 250/548 |
| 5,025,168 A * | 6/1991 | Aoki | | G03F 9/7049 250/548 |
| 5,026,166 A * | 6/1991 | van der Werf | | G03F 9/7049 356/401 |
| 5,069,549 A * | 12/1991 | Harding | | G01B 11/254 250/237 G |
| 5,072,126 A * | 12/1991 | Progler | | G03F 9/7065 250/548 |
| 5,118,953 A * | 6/1992 | Ota | | G03F 9/7065 250/548 |
| 5,144,363 A * | 9/1992 | Wittekoek | | G03F 9/7049 355/53 |
| 5,151,754 A * | 9/1992 | Ishibashi | | G03F 9/7023 250/548 |
| 5,162,656 A * | 11/1992 | Matsugu | | G03F 9/7023 250/548 |
| 5,182,455 A * | 1/1993 | Muraki | | G03F 9/7049 250/548 |
| 5,184,196 A * | 2/1993 | Nakagawa | | G03F 7/70066 250/548 |
| 5,189,494 A * | 2/1993 | Muraki | | G03F 9/7049 250/237 G |
| 5,191,200 A * | 3/1993 | van der Werf | | G03F 9/7034 250/548 |
| 5,202,749 A * | 4/1993 | Pfister | | G01B 11/254 250/237 G |
| 5,307,152 A * | 4/1994 | Boehnlein | | G06T 7/521 250/237 G |
| 5,325,176 A * | 6/1994 | Suda | | G03F 9/7076 356/400 |
| 5,347,356 A * | 9/1994 | Ota | | G03F 7/70633 356/490 |
| 5,414,514 A * | 5/1995 | Smith | | H01J 37/3045 250/548 |
| 5,489,986 A | 2/1996 | Magome et al. | | |
| 5,493,403 A * | 2/1996 | Nishi | | G03F 9/7092 356/401 |
| 5,652,426 A * | 7/1997 | Maeda | | G02B 27/4277 359/569 |
| 5,657,125 A * | 8/1997 | Kato | | G01D 5/38 250/237 G |
| 5,738,825 A * | 4/1998 | Rudigier | | G01N 21/253 422/82.11 |
| 5,808,742 A * | 9/1998 | Everett | | G01B 9/02072 356/508 |
| 5,880,839 A * | 3/1999 | Ishizuka | | G01D 5/38 250/237 G |
| 5,898,486 A * | 4/1999 | Chesko, Sr. | | G01B 11/165 356/35.5 |
| 6,154,278 A * | 11/2000 | Ito | | G01D 5/38 250/237 G |
| 6,291,817 B1 * | 9/2001 | Kobayashi | | G01B 11/254 250/559.22 |
| 6,522,411 B1 | 2/2003 | Moon et al. | | |
| 6,731,391 B1 * | 5/2004 | Kao | | G01B 11/254 250/237 G |
| 6,864,956 B1 * | 3/2005 | Teong | | G03F 9/7049 356/508 |
| 6,937,334 B2 * | 8/2005 | Monshouwer | | G03F 9/7049 356/399 |
| 7,116,430 B2 * | 10/2006 | Degertekin | | G01B 11/026 356/498 |
| 7,268,860 B1 * | 9/2007 | Chen | | G01B 11/165 356/35.5 |
| 7,880,880 B2 * | 2/2011 | Van Bilsen | | G03F 9/7076 250/237 G |
| 7,990,543 B1 * | 8/2011 | Mello | | G01B 9/02081 356/520 |
| 9,459,093 B2 * | 10/2016 | Sato | | G01B 11/2441 |
| 10,162,087 B2 * | 12/2018 | Goodwin | | G02B 27/4233 |
| 10,378,933 B2 * | 8/2019 | Goodwin | | G01D 5/34715 |
| 10,585,357 B2 * | 3/2020 | Van Der Schaar | | G03F 7/70683 |
| 2002/0080365 A1 | 6/2002 | Monshouwer et al. | | |
| 2004/0174536 A1 * | 9/2004 | Jourlin | | G01D 5/38 356/521 |
| 2004/0179184 A1 * | 9/2004 | Levasier | | G03F 9/7003 355/75 |
| 2004/0264859 A1 * | 12/2004 | Nagashima | | G02B 5/1814 385/37 |
| 2006/0145066 A1 * | 7/2006 | Tamiya | | G01D 5/38 250/231.13 |
| 2007/0146669 A1 | 6/2007 | Butler | | |
| 2008/0111995 A1 | 5/2008 | Lee et al. | | |
| 2009/0001260 A1 | 1/2009 | Klaver et al. | | |
| 2009/0153880 A1 * | 6/2009 | Klaver | | G03F 9/7049 356/614 |
| 2010/0181503 A1 | 7/2010 | Yanagida et al. | | |
| 2010/0201811 A1 * | 8/2010 | Garcia | | G01B 11/254 348/136 |
| 2010/0259768 A1 * | 10/2010 | Frissen | | G01D 5/38 356/614 |
| 2012/0093297 A1 * | 4/2012 | Kondoh | | G21K 1/06 250/237 G |
| 2013/0048842 A1 * | 2/2013 | Goodwin | | G01D 5/34723 250/231.1 |
| 2015/0198438 A1 * | 7/2015 | Hetzler | | G01M 11/005 356/458 |
| 2015/0316856 A1 * | 11/2015 | Koenen | | G03F 7/70133 359/566 |
| 2015/0324657 A1 * | 11/2015 | Cho | | G06V 10/145 382/203 |
| 2017/0292860 A1 * | 10/2017 | Goodwin | | G01D 5/38 |
| 2018/0231899 A1 * | 8/2018 | Goodwin | | G02B 7/365 |

(56) References Cited

U.S. PATENT DOCUMENTS

| | | | | |
|---|---|---|---|---|
| 2019/0212130 A1* | 7/2019 | Wang | .................... | G01B 11/165 |
| 2020/0200954 A1* | 6/2020 | Mossberg | ............ | G02B 5/1819 |
| 2020/0363193 A1* | 11/2020 | Kaelberer | .............. | G01B 11/14 |
| 2022/0011095 A1* | 1/2022 | Stiepan | ................ | G02B 5/1871 |
| 2022/0214193 A1* | 7/2022 | Wu | .................... | G01D 5/35306 |
| 2023/0091424 A1* | 3/2023 | Kang | .................. | G01B 11/254 |
| | | | | 356/605 |

FOREIGN PATENT DOCUMENTS

| | | | |
|---|---|---|---|
| WO | WO200011431 A1 | 3/2000 | |
| WO | WO2011081692 A2 | 7/2011 | |

OTHER PUBLICATIONS

International Search Report and Written Opinion dated Jul. 9, 2018 in PCT/US2018/019137.

Supplementary European Search Report, dated Dec. 8, 2020, in European Patent Application Serial No. EP18757317.5.

He, X. et al. "Phase-shifting analysis in moire interferometry and its applications in electronic packaging". Optical Engineering, Soc. of Photo-Optical Instrumentation Engineers, May 1, 1998, vol. 3, No. 5, pp. 1410-1419.

Dupre, J.C. et al. "Methode, Independenante Des Petites Translations de L'Objet, Pour La Mesure Locale et a Distance Avec Quasi-Heterodynage de L'Etat De Deformations". Comptes Rendus de L Academie Des Sciences: Serie II: Mecanique-Physique-Chimie-Astronomie, Editions Scientifques & Medicales, Aug. 13, 1992, vol. 315, No. 4, Serie 02, pp. 393-398. Elsevier, FR.

EPC Communication Pursuant to Rule 94(3), in Application Serial No. 18 757 317.5, issued by the European Patent Office dated Feb. 28, 2023.

Reply to EPC Communication Pursuant to Rule 94(3), in Application Serial No. 18 757 317.5, filed with the European Pateht Office on Jun. 15, 2023.

* cited by examiner $$\begin{aligned}
I_{(0,0)}^2 &+ 4A_{(i+1,j)}^2 \cos^2\left[\frac{2\pi}{P}\Delta_X\right] + 4A_{(i,j+1)}^2 \cos^2\left[\frac{2\pi}{P}\Delta_Y\right] + 4A_{(i+1,j+1)}^2 \cos^2\left[\frac{2\pi}{P}(\Delta_X + \Delta_Y)\right] + 4A_{(i-1,j+1)}^2 \cos^2\left[\frac{2\pi}{P}(\Delta_X - \Delta_Y)\right] \\
&+ 4A_{(0,0)}A_{(i+1,j)}\cos\left[\alpha_{(0,0)} - \alpha_{(i+1,j)}\right]\cos\left[\frac{2\pi}{P}\Delta_X\right] + 4A_{(0,0)}A_{(i,j+1)}\cos\left[\alpha_{(0,0)} - \alpha_{(i,j+1)}\right]\cos\left[\frac{2\pi}{P}\Delta_Y\right] \\
&+ 4A_{(0,0)}A_{(i+1,j+1)}\cos\left[\alpha_{(0,0)} - \alpha_{(i+1,j+1)}\right]\cos\left[\frac{2\pi}{P}(\Delta_X + \Delta_Y)\right] + 4A_{(0,0)}A_{(i-1,j+1)}\cos\left[\alpha_{(0,0)} - \alpha_{(i-1,j+1)}\right]\cos\left[\frac{2\pi}{P}(\Delta_X - \Delta_Y)\right] \\
&+ 8A_{(0,0)}A_{(i,j+1)}\cos\left[\alpha_{(i+1,j)} - \alpha_{(i,j+1)}\right]\cos\left[\frac{2\pi}{P}\Delta_X\right]\cos\left[\frac{2\pi}{P}\Delta_Y\right] \\
&+ 8A_{(i+1,j)}A_{(i+1,j+1)}\cos\left[\alpha_{(i+1,j)} - \alpha_{(i+1,j+1)}\right]\cos\left[\frac{2\pi}{P}\Delta_X\right]\cos\left[\frac{2\pi}{P}(\Delta_X + \Delta_Y)\right] + 8A_{(i+1,j)}A_{(i-1,j+1)}\cos\left[\alpha_{(i+1,j)} - \alpha_{(i-1,j+1)}\right]\cos\left[\frac{2\pi}{P}\Delta_X\right]\cos\left[\frac{2\pi}{P}(\Delta_X - \Delta_Y)\right] \\
&+ 8A_{(i,j+1)}A_{(i+1,j+1)}\cos\left[\alpha_{(i,j+1)} - \alpha_{(i+1,j+1)}\right]\cos\left[\frac{2\pi}{P}\Delta_Y\right]\cos\left[\frac{2\pi}{P}(\Delta_X + \Delta_Y)\right] + 8A_{(i,j+1)}A_{(i-1,j+1)}\cos\left[\alpha_{(i,j+1)} - \alpha_{(i-1,j+1)}\right]\cos\left[\frac{2\pi}{P}\Delta_Y\right]\cos\left[\frac{2\pi}{P}(\Delta_X - \Delta_Y)\right] \\
&+ 8A_{(i+1,j+1)}A_{(i-1,j+1)}\cos\left[\alpha_{(i+1,j+1)} - \alpha_{(i-1,j+1)}\right]\cos\left[\frac{2\pi}{P}(\Delta_X + \Delta_Y)\right]\cos\left[\frac{2\pi}{P}(\Delta_X - \Delta_Y)\right]
\end{aligned}$$

FIG. 7

MEASUREMENT OF A CHANGE IN A GEOMETRICAL CHARACTERISTIC AND/OR POSITION OF A WORKPIECE

CROSS-REFERENCE TO RELATED APPLICATIONS

The present application claims priority from and benefit of U.S. Provisional Patent Applications No. 62/462,489 filed on Feb. 23, 2017 and No. 62/548,178 filed on Aug. 21, 2017. The disclosure of each of these patent applications is incorporated herein by reference.

TECHNICAL FIELD

The present invention relates generally to measurements of distortions of a shape of an object and, more particularly, to measurements of sub-nanometer spatial distortions (especially in-plane distortions) of a planar substrate (such as a semiconductor wafer), for example.

BACKGROUND

When the amount of spatial distortions of the shape of a workpiece being measured is minute—for example, on a scale of a nanometer or less—the shortcomings and inaccuracies of the conventional methods of determining distortions can no longer be overlooked or neglected.

SUMMARY

A first aspect of the present embodiment is a measurement system for use in measurements of in-plane distortions of a workpiece including a workpiece diffraction grating disposed in mechanical cooperation with the workpiece, the workpiece diffraction grating configured to diffract light in reflection. The measurement system comprising: an optically-transparent member having a reference diffraction grating defined on a first surface thereof, the reference diffraction grating configured to diffract light in transmission, the optically-transparent member can be disposed to have the reference diffraction grating face the workpiece diffraction grating in a parallel and spaced-apart fashion to define a gap between surfaces of the workpiece and reference diffraction gratings, and an illumination system configured to deliver light to a second surface of the optically-transparent member such that said light impinges onto the reference diffraction grating at an oblique angle of incidence.

A second aspect of the present embodiment is a method for measurement of an in-plane distortion of a workpiece. The method comprising: diffracting light, incident obliquely onto a transmitting reference diffraction grating, to form first and second beams representing, respectively, diffractive orders having equal absolute values but opposite signs; receiving said first and second beams at a reflecting workpiece diffraction grating disposed in a parallel and spatially-spaced relationship with respect to the transmitting reference diffraction grating and in a mechanical cooperation with the workpiece, to form third and fourth beams diffracted at the reflecting workpiece diffraction grating along an axis, wherein the first and second beams are incident onto the reflecting workpiece diffraction grating at respectively-corresponding angles having equal absolute values but opposite signs; wherein the axis is substantially perpendicular to both the reflecting and transmitting diffraction gratings; and acquiring a spatial light distribution defined by optical interference between the third and fourth beams with an optical detector to produce data representing the in-plane distortion of the substrate, said spatial light distribution being substantially insensitive to an out-of-plane distortion of the substrate.

A third aspect of the present embodiment is a method for determining an in-plane distortion of a workpiece. The method comprising: with an optical detector, receiving light containing only two diffractive orders having the same absolute value but opposite signs, said light having diffracted twice, respectively at a transmitting reference diffracting grating and then at a reflecting workpiece diffraction grating, wherein one of said reference and workpiece gratings is mechanically cooperated with the workpiece, to produce optical data including first data that represent said in-plane optical distortion while being devoid of second data that represent out-of-plane optical distortion of the substrate.

A fourth aspect of the present embodiment is a method for measuring a spatial distortion of a target surface of a workpiece. The method comprising: transmitting light twice through a reference pattern-generator; interacting said light, that has transmitted through the reference pattern-generator, with a workpiece pattern-generator; with an optical detector, acquiring first and second beams formed by said light as a result of said transmitting and interacting to produce a signal characterizing geometry of interference fringes formed at said detector by the first and second beams; and producing indicia representing at least one of a type and a value of said spatial distortion.

A fifth aspect of the present embodiment is a method for measuring a spatial distortion of a target surface of a workpiece, the method comprising: transmitting light twice through a reference pattern-generator; interacting said light, that has transmitted through the reference pattern-generator, with a workpiece pattern-generator; with an optical detector, acquiring first and second beams formed by said light as a result of said transmitting and interacting to produce a signal characterizing geometry of interference fringes formed at said detector by the first and second beams; producing indicia representing at least one of a type and a value of said spatial distortion along a first axis of the target surface; rotating one of the reference and workpiece pattern-generators in the plane of said one of the reference and workpiece pattern-generators by a multiple of 90 degrees; repeating the transmitting, interacting, and producing to produce indicia representing at least one of a type and a value of said spatial distortion along a second axis of the target surface, the second axis being perpendicular to the first axis.

A sixth aspect of the present embodiment is a measurement apparatus which measures a distortion in a plane of a workpiece. The apparatus comprising: an optical member, arranged to face the workpiece, including a plurality of first diffraction grating provided at a plural positions; an irradiation system which irradiates a measurement radiation to the plurality of first diffraction grating so as to irradiate a plurality of second diffraction grating with a radiation from the plurality of first grating, the plurality of second diffraction grating are formed at a plural positions on the workpiece; and a detector which detects a radiation from the plurality of second diffraction grating.

A seventh aspect of the present embodiment is a measurement method which measures a distortion in a plane of a workpiece. The method comprising: providing a plurality of first diffraction grating provided at a plural positions; irradiating the plurality of first diffraction grating with a measurement radiation; diffracting the measurement radiation at the plurality of first diffraction grating; impinging the diffracted measurement radiation to a plurality of second diffraction grating formed at plural positions on the workpiece; detecting a radiation from the plurality of second diffraction grating.

BRIEF DESCRIPTION OF THE DRAWINGS

FIG. 7 illustrates an example of an analytical expression required by related art to compute shape distortions of a target based on optical measurements that are carried out with the use of two 2D diffraction gratings.

DETAILED DESCRIPTION

Embodiment(s) of the present invention are devised to implement measurements of the distortions of a workpiece. These distortions can be thought of as combining the two types of deviations of the shape of a workpiece grating from its ideal shape: the deviations occurring in-plane of the workpiece grating, and those occurring out-of-plane of the workpiece grating. Notably, implementations of the present embodiment address the problem of detecting an in-plane distortion of a reflective workpiece grating surface that is decoupled from-that is, insensitive to out-of-plane distortion of the workpiece grating surface. Moreover, the sought-after detection is implemented while minimizing optical noise caused by stray light. In certain embodiments, both of these goals are achieved by complementing the exposure tool with an auxiliary "reference grating" (also referred to as an analyzer grating) configured to operate in transmission.

Generally, the reference grating is disposed between a light source (used for characterization of the distortions of the workpiece grating and the workpiece) and the workpiece grating itself, and is exposed to light incident from such light source. Then upon diffraction of light, transmitted through the reference grating, the workpiece grating is further exposed to beams of light that represent diffraction orders formed at the reference grating. In certain embodiments, in response to being illuminated with light diffracted at the reference grating, the workpiece grating forms, in turn, zero-order and first-order diffracted beams directed substantially along a vector perpendicular to the surface of the workpiece grating. The present idea stems from the realization that an optical field distribution formed as a result of interference of these beams diffracted off of the workpiece grating contains encoded information representing the in-plane distortion of the workpiece grating and the workpiece.

For example, the measurement system can be used to sequentially measure the distortion of one or more of test workpieces that are sequentially retained by a workpiece chuck. Next, a repeatable portion of workpiece distortion caused by the workpiece chuck can be determined using the measurement system. Subsequently, during the exposure process used to print each actual workpiece, the actual workpiece can be positioned in a fashion to compensate for (and diminish the effects of) at least a portion of the workpiece distortion.

Figure 1:
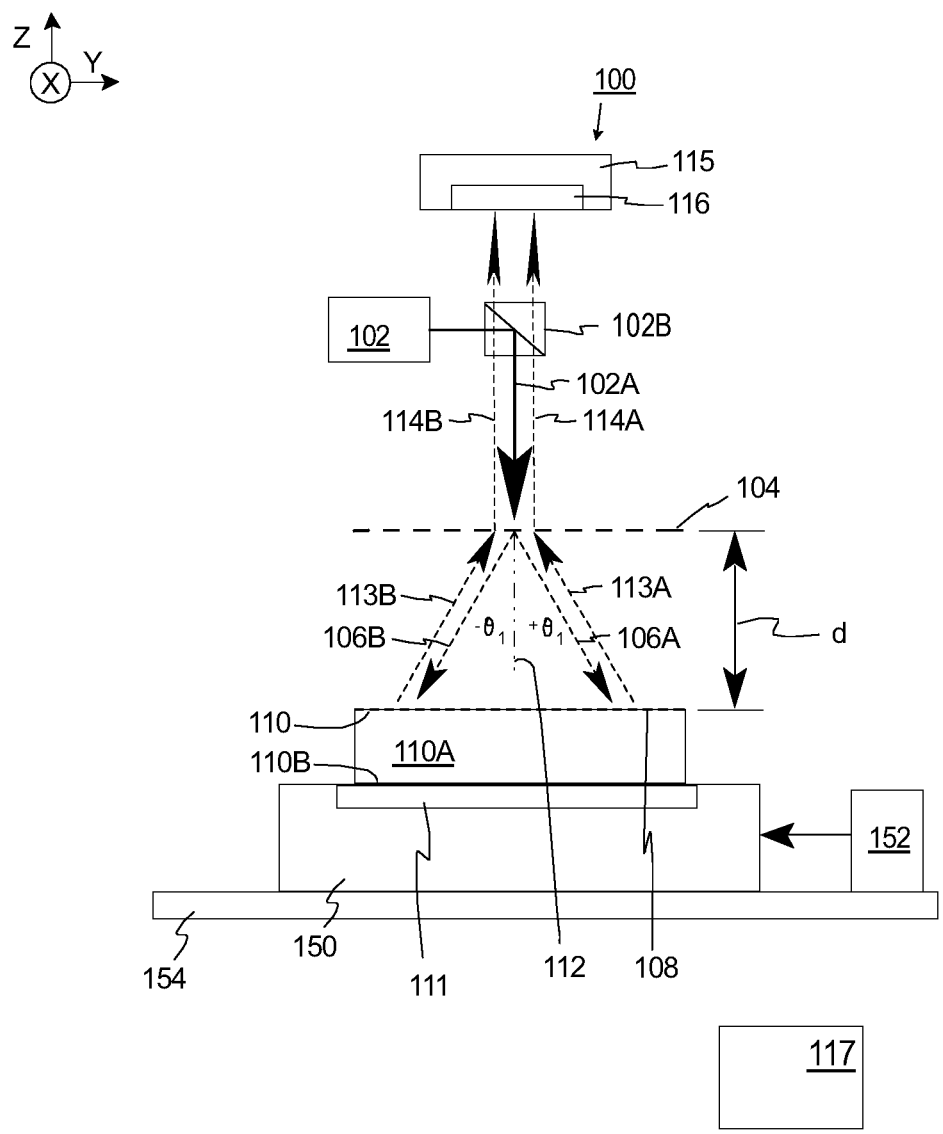
FIG. 1 is a schematic diagram of a spatial distortion measurement system structured according to the idea of the invention.

In reference to FIG. 1, a non-exclusive embodiment 100 of the measurement system includes a reference diffraction grating 104 (also referred to as a reference pattern-generator) disposed to be spatially-separated from a target surface 110 of a workpiece 110A to be measured. The target surface 110 can include a workpiece diffraction grating 108 (also referred to as a workpiece pattern-generator) that is secured to, define in, or formed onto the workpiece 110A.

In certain embodiments, the workpiece 110A is retained by a workpiece chuck 111 (e.g. a vacuum or other type of chuck) and the measurement system 100 is used to measure the in-plane deformation caused by the chuck 111. Further, the workpiece 110A can be a test workpiece 110A that includes the workpiece diffraction grating 108 formed in the target surface 110, and an opposed surface 110б that is retained by the workpiece chuck 111. In this design, the measurement system 100 can be used to sequentially measure the distortion of one or more of test workpieces that are sequentially retained by a workpiece chuck 111. Next, a repeatable portion of workpiece distortion caused by the workpiece chuck 111 can be determined. Subsequently, during the exposure process used to print each actual production workpiece (not shown), the production workpiece can be positioned in a fashion to compensate for (and diminish the effects of) at least a portion of the workpiece distortion. In this design, the production workpiece exposed with the lithography system does not include the workpiece diffraction grating 108.

It should be noted that the reference diffraction grating 104 and/or the workpiece diffraction grating 108 can be referred to as a first or second diffraction grating or as a first or second pattern generator. Further, for each embodiment provided herein, each grating can include a plurality of gratings. It should also be noted that one or both of the diffraction gratings 104, 108 can be a phase diffraction grating, although other types such as amplitude gratings can be used as well.

In the embodiment illustrated in FIG. 1, the reference grating 104 is transmissive and the workpiece grating 108 is reflective.

Additionally, the measurement system 100 can include a light source 102 that generates a beam of light 102A (a measurement beam) that is directed via a beam splitter 102B (e.g. a cube) onto the transmissive reference grating 104 to form diffracted beams 106A, 106B that are further propagating towards the workpiece grating 108 at respectively corresponding angles (shown as $\theta_1$, $-\theta_1$), determined with respect to the direction of incidence (shown with a dashed line 112) as a function of the angle of incidence of light onto the grating 108, the wavelength of light 102A, geometry of the gratings 104, 108, and the separation distance ("gap")

"d" between the gratings 104, 108. In one non-exclusive embodiment, the wavelength of the light 102A is between approximately 600-700 nanometers and the separation distance is between 10 microns and several millimeters. However, other values are possible.

In one embodiment, the gratings 104, 108 are substantially parallel to each other (in parallel planes). For example, substantially parallel can mean within at least one milliradian of being parallel. Further, in certain embodiments, one of the gratings 104, 108 can be fixed. For example, the reference grating 104 can be fixed and the workpiece grating 108 can be moved relative to the reference grating 104. Alternatively, the workpiece grating 108 can be fixed and the reference grating 104 can be moved relative to the workpiece grating 108.

In one embodiment, the reference grating 104 acts as a first light pattern generator, with optical characteristic (such as transmissivity) that is periodic along a first axis (e.g. the Y axis) and substantially constant along a second axis (e.g. the X axis) that is transverse to the first axis (aka a one dimensional "1D" diffraction grating).

The workpiece grating 108, which is configured to operate in reflection, is judiciously disposed in a Littrow configuration with respect to beams 106A, 106B incident onto the grating 108 such as to form, in reflection, respectively-corresponding diffracted beams 113A, 113B propagating in opposite directions—that is, towards the reference grating 104. In one embodiment, the workpiece grating 108 acts as a second light pattern generator, with optical characteristic (such as reflectivity) that is periodic along both a first axis (e.g. the Y axis) and a second axis (e.g. the X axis) that is transverse to the first axis (aka a two dimensional "2D" diffraction grating).

Upon diffraction in transmission through the reference grating 104, the beams 113A, 113B form, in turn, respectively corresponding diffracted beams 114A, 114B, directed to co-propagate towards an optical detection system 115 that includes an optical detector 116. Diffracted beams 114A, 114B interfere at the photosensitive surface of the detector 116 and form a distribution of irradiance that the detector 116 captures. The optical detection system 115 is generally operably connected to a programmable processor 117 that evaluates the data from the detector 116 to determine the in-plane distortion of the target surface 110 of the workpiece 110A. Phrased differently, the distribution of optical irradiance of interest at the optical detector 116 is formed as a result of sequential interaction of the incident beam of light with two diffraction pattern generators (gratings 104, 108).

In one embodiment, between these pattern generators, the first pattern-generator (the reference grating 104) has a first optical characteristic that is periodic along a first axis and constant along a second axis (where the first and second axes are transverse to one another), while the second pattern-generator (the workpiece grating 108) has a second optical characteristic that is periodic along both the first and second axes. Thus, in this embodiment, the reference grating 104 is different from the workpiece grating 108. Alternatively, the reference grating 104 can be a 2D diffraction grating while the workpiece grating 108 is a 1D grating.

Additionally, in one embodiment, the pitch of the reference grating 104 is different from the pitch of the workpiece grating 108. In FIG. 1, the pitch ratio of the gratings 104, 108 is two to one, with the pitch of the reference grating 104 being two times greater than the pitch of the workpiece grating 108. Stated in another fashion, the workpiece diffraction grating 108 has a first period, the reference diffraction grating 104 has a second period, and the second period is substantially twice as big as the first period. It should be noted that other pitch ratios are possible. For example, it can be useful to intentionally deviate slightly from the 2:1 ratio to create a fringe pattern. As an example, slight deviations from the 2:1 ratio of up to one percent can be tolerated.

As shown, in a specific implementation the beam of light 102A is directed onto the reference grating 104 substantially perpendicularly. However, the operation of the system 100 with the angle of incidence being oblique (inclined with respect to the normal of the surface of the first pattern generator 104) is intended to be within the scope of the embodiment.

According to the idea of the embodiment, the distribution of irradiance on the surface of the detector 116, interferometrically-formed by beams 114A, 114B, is measured multiple times while in a first chosen orientation, and multiple times while in second chosen orientation to assess the shape of the target surface 110 carrying the workpiece grating 108. As illustrated in FIG. 1, +1 diffracted beam 114A and the −1 diffracted beam 114B come from different points on the workpiece grating 108 and thus are spaced apart on the detector 116. For example, the +1 diffracted beam 114A and the −1 diffracted beam 114B can be separated several hundred microns on the detector 116.

In the first measurement step, the gratings 104 and 108 disposed in a first chosen orientation (for example, with the ruling or lines of the 1D grating 104 and with a first set of rulings of the 2D grating 108 aligned with the x-axis, as shown). In this design, the light beam 102A is directed at the gratings 104, 108 and a first interference image is captured with detector 116. Next, (i) one of the gratings 104, 108 is moved relative to the other grating 108, 104 a phase shift (e.g. a fraction of the period of the workpiece grating 108), and (ii) the light beam 102A is directed at the gratings 104, 108 and a second interference image is captured with detector 116 (e.g. a camera). This process of stepping the phase shift and capturing an image is repeated a number of times for the first chosen orientation of the gratings 104, 108. For example, this process can be repeated between five and fifty times to capture between five and fifty separate interference pattern images while the gratings 104, 108 are in the first chosen orientation. However, less than five or more than fifty images can be captured depending up the desired resolution.

The processor 117 can evaluate the plurality of interference images captured while the gratings 104, 108 are in the first chosen orientation to determine the profile of the target surface 110 in one, initial direction.

As non-exclusive examples, each phase shift can be ⅛, or ⅙ of the period. However, other phase shift values are possible.

During the second measurement step, one of the gratings 104 and 108 has been moved relative to the other so that the gratings 104, 108 are disposed in a second chosen orientation (for example, with the ruling or lines of the 1D reference grating 104 and with a second set of rulings of the 2D grating 108 aligned with the Y-axis, as shown). Stated in another fashion, before the second measurement step, one of the gratings 104, 108 is rotated in the plane of the grating with respect to the other of the gratings 104, 108. As a result, the second step of the measurement is conducted while the gratings are in the second chosen orientation. For example, if the reference grating 104 is rotated by 90 degrees in plane as compared to its first chosen orientation, the second chosen orientation ruling/lines of the grating 104 are aligned along the y-axis of the local coordinate system.

In this design, during the second measurement step, the light beam 102A is directed at the gratings 104, 108 and another interference image is captured with detector 116. Next, (i) one of the gratings 104, 108 is moved relative to the other grating 108, 104 the phase shift (e.g. a fraction of the period of the workpiece grating 108), and (ii) the light beam 102A is directed at the gratings 104, 108 and yet another interference image is captured with detector 116. This process of stepping the phase shift and capturing an image is repeated a number of times for the second chosen orientation of the gratings 104, 108. For example, this process can be repeated between five and fifty times to capture between five and fifty separate interference pattern images while the gratings 104, 108 are in the second chosen orientation.

The processor 117 can evaluate the plurality of interference images captured while the gratings 104, 108 are in the second chosen orientation to determine the profile of the target surface 110 in the second direction. As a result of the second measurement step, the surface profile and/or shape is determined along another direction that is transverse to the initial direction.

Understandably, the combined results of the first and second measurements allow a skilled person to determine the surface profile and/or shape fully, in the plane defined by both measurement directions.

In some embodiments, the workpiece 110A is supported by a stage 150 that can be moved by a stage mover 152 to facilitate, for example, loading of the workpiece 110A, alignment of the two gratings 104, 108 to each other, and adjustments along the Z axis to control the spacing, d. In these embodiments, the stage mover 152 can be used to move the workpiece and workpiece gratings 108 relative to the reference grating 104 (which can be fixed) each phase shift during each measurement step. Further, the stage mover 152 can rotate the workpiece 110A with the workpiece grating 108 by 90 degrees relative to the reference grating 104 between the first and second measurement steps.

Additionally, or alternatively, the measurement system 100 could include a reference mover (not shown) for selectively moving the reference grating 104 relative to the workpiece grating 108.

In FIG. 1, a mechanical support unit 154 can support the stage 150, the workpiece 110A and the stage mover 152.

Additionally, the measurement system 100 can include an optical system (not shown), e.g. one or more lenses that direct the light at the detector 116.

In some embodiments, where real-time data are available from the detector 116, data derived from the detector signal can be used to align the gratings 104, 108 about the Z axis and to ensure that the 90 degree rotation is accurate. For example, if the ratio of bright and dark pixels (i.e., the contrast of the interference pattern) is monitored, the amount of rotation can be adjusted to find the orientation that provides maximum contrast.

In related embodiments, rotations at angles other than 90 degrees may be used. For example, other multiples of 90 degrees (e.g., 270, 450, or 630 degrees) can be used to obtain equivalent measurements.

Based on the determination of the overall 2D shape/profile of the surface of interest in two above-discussed measurement steps, a conclusion is made whether or not such surface deviates in any shape or form from a predetermined reference surface and/or shape. In other words, a distortion of the shape/profile of the surface with respect to the reference surface can be determined.

The same measurement principles can be applied to embodiments where the reference grating 104 is a 2D grating and the workpiece grating is a 1D grating. This configuration may be less light-efficient, because the light is diffracted twice by a 2D grating (where it is divided into multiple orders in two dimensions, twice; once at each pass) and only once by a 1D grating, but it may be advantageous for certain applications.

Implementations of the present embodiment substantially reduces the complexity of the measurement itself and the number of mathematical operations required to assess the shape of the measured surface, and further improves the measurement performance by reducing the number of possible sources of experimental errors by dealing with and accounting for only two orders of diffraction (formed at the 1D gratings 104) at a time.

It is appreciated that the proposed method is easily extended to define, with precision and accuracy unparalleled in related art, the change of distortion and/or shape of the surface in question as a function of changing ambient conditions. To this end, the same two-step measurement of the target surface can be carried out at a different time and/or under different ambient conditions to obtain a second profile/shape of the surface. The change of the shape is then determined as a result of comparison of the results of the first measurement step with those of the second measurement step.

Figure 2:
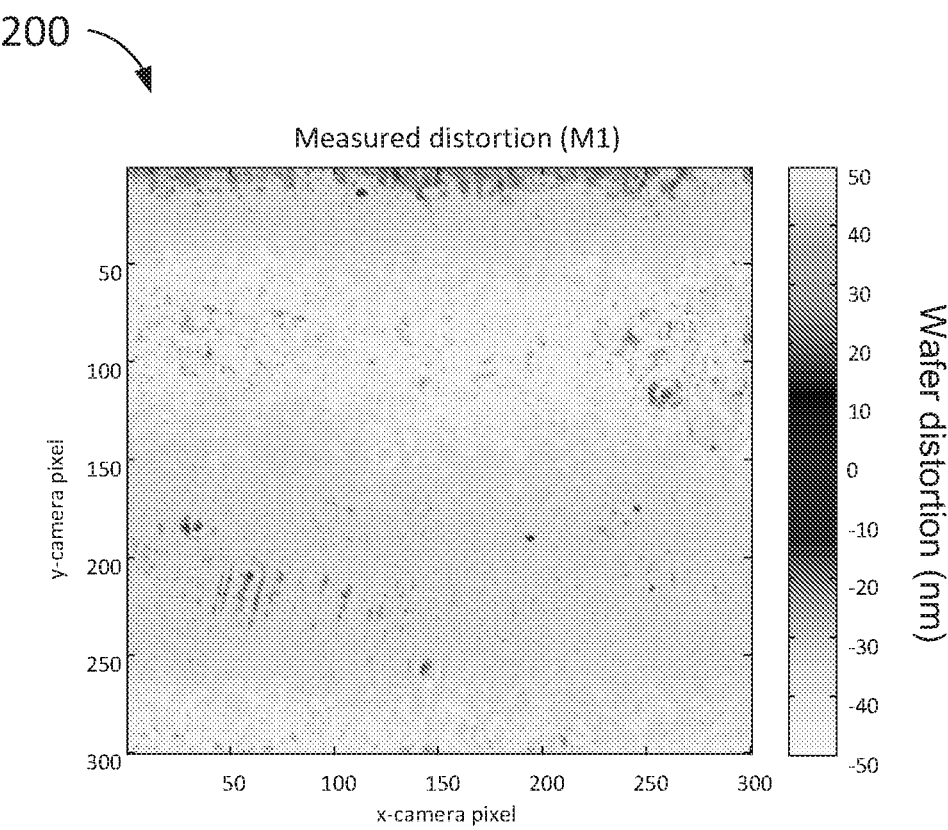
FIG. 2 is an image of a surface of a target workpiece (as shown—a planar surface of a semiconductor wafer) illustrating the shape of such surface measured according to an embodiment of the invention.
Figure 3:
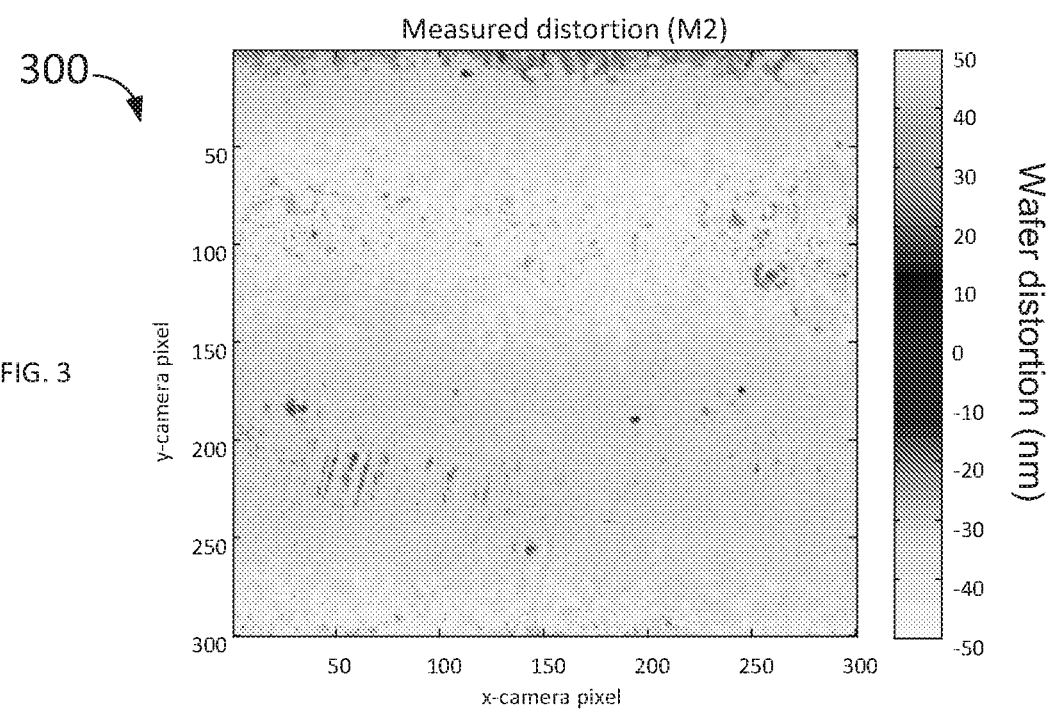
FIG. 3 is a follow-up image of the same surface of the target workpiece, measured at a later time as compared with that of the image of FIG. 2, according to an embodiment of the invention.
Figure 4:
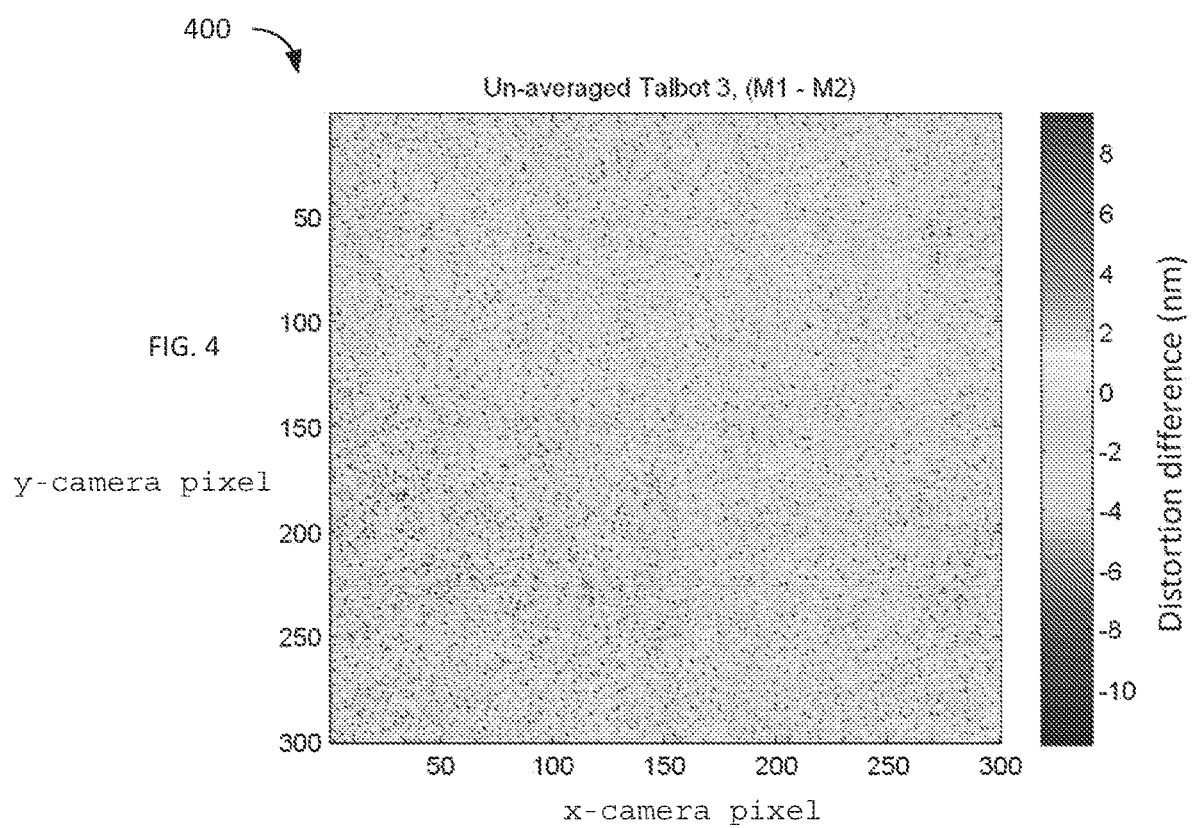
FIG. 4 illustrates the difference between the images of FIGS. 2 and 3, obtained without averaging of raw data.

FIGS. 2, 3, and 4 provide illustrations of the empirically-determined difference between the shapes and/or in-plane distortions of the measured surface that occurred between the first measurement (M1, illustrated in FIG. 2) and the second measurement (M2, illustrated in FIG. 3) of the same surface, carried out under different conditions (either at different times or with different ambient conditions).

More specifically, in FIG. 2, image 200 represents the distortion of the target surface as determined by combining the plurality of interference pattern images captured at each measurement step when the workpiece was at a first condition. Similarly, in FIG. 3, image 300 represents the distortion of the target surface as determined by combining the plurality of interference pattern images captured at each measurement step when the workpiece was at a second condition. Further, image 400 represents the un-averaged difference between images 200 and 300. In this embodiment, each of the images 200, 300, and 400 illustrates the shape of the workpiece 110 on a nanometer scale, relative to the reference grating 104.

As a result of the comparison between the outputs from the two aggregate measurements carried out according to the embodiment of the invention, at least one of the type (such as, for example, stretching or compressing, or warpages or tilt) and value (that is, the geometric measure such as length or sag or angle) of the deviation of the spatial profile of the workpiece under test can be determined.

In practice, as shown in FIG. 4 without averaging, the difference 400 between the shapes 200, 300 was determined on a nanometer scale by assessing the interferometric fringes at the surface of the detector with the use of a 7-frame algorithm. For example, a sequence of seven images which were acquired where, in each image, one of the gratings was shifted by an additional $\frac{1}{8}^{th}$ of the grating pitch (for a total of $\frac{7}{8}$ths of a grating pitch). This phase shifting causes the phase of fringe pattern to change sinusoidally by a known amount, and the initial phase at each pixel can be determined.

Figure 5:
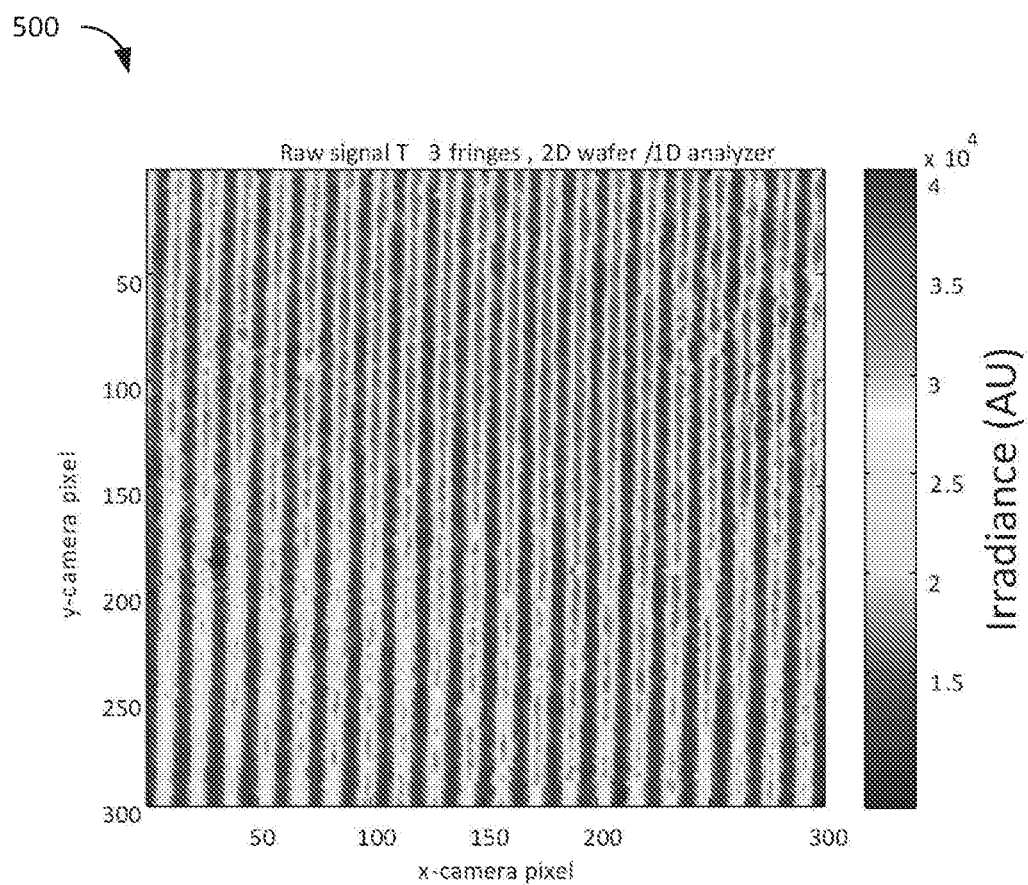
FIG. 5 provides an example of the irradiance pattern on a light detector.

In FIG. 5, image 500 is the interferometric fringes captured by the optical detector at one point in time when the light is directed at the gratings. Image 500 illustrates a distribution of an irradiance field on the surface of the optical detector formed as a result of light manipulation with the use of the measurement system 100 of FIG. 1. With reference to FIG. 4, the empirically-determined changes in surface profile that occurred between the two different images 200 (M1) (FIG. 2) and 300 (M2) (FIG. 3), demonstrated the spatial resolution characterized by a σ of about 2.13 nm.

Figure 6:
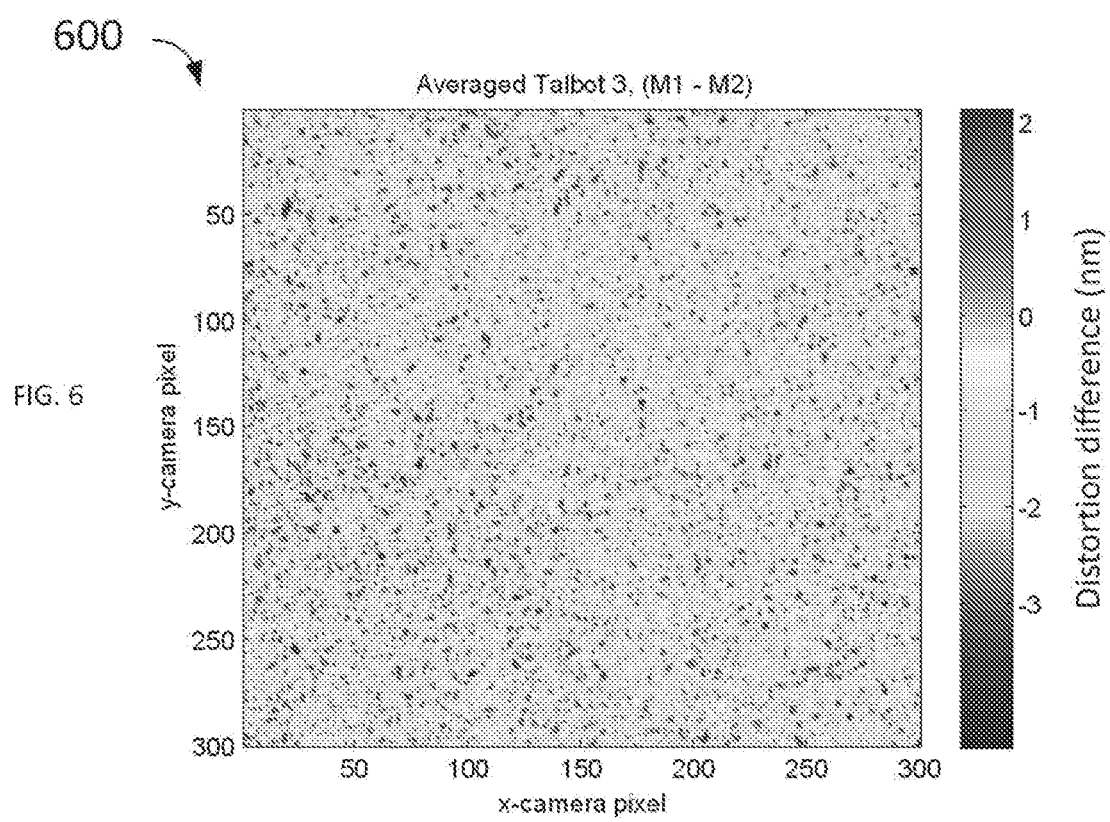
FIG. 6 illustrates the results of averaging of the data represented by FIG. 4 which results in excellent repeatability with a standard deviation of less than one nanometer.

FIG. 6 illustrates the results of averaging of the results presented in FIG. 4 performed over an 8-by-8 pixel array (24 micron by 24 micron area of the irradiance distribution on the detector) resulting in an increase of the spatial resolution to that characterized by a σ of about 0.76 nm.

It is appreciated, therefore, that as a result of the implementation of the method of the present invention, the measurement of distortion of the optical shape of the chosen target surface has been demonstrated with a sub-nanometer accuracy. Unless explicitly defined otherwise, the term "distortion" when used in connection to the shape or spatial profile of a surface of interest is used to refer to the deviation of such shape or spatial profile from a reference and/or predetermined shape or spatial profile. In one measurement, the shape distortion of the 300 mm diameter semiconductor wafer has been measured.

It should be noted that in certain embodiments, in order to reach the sub-nm accuracy, during each measurement step, gratings 104, 108 are phase shifted with respect to one another. The methods of phase shifting are to translate in x or y (the plane of the gratings) either the workpiece grating 108 or reference grating 104 in steps that are a fraction of the pitch of the gratings. The exact fraction depends on the design of the measurement system 100. In one embodiment, the fraction of the pitch corresponds to a phase shift of the fringe pattern in FIG. 5 of a desired amount, typically pi/2.

Figure 8:
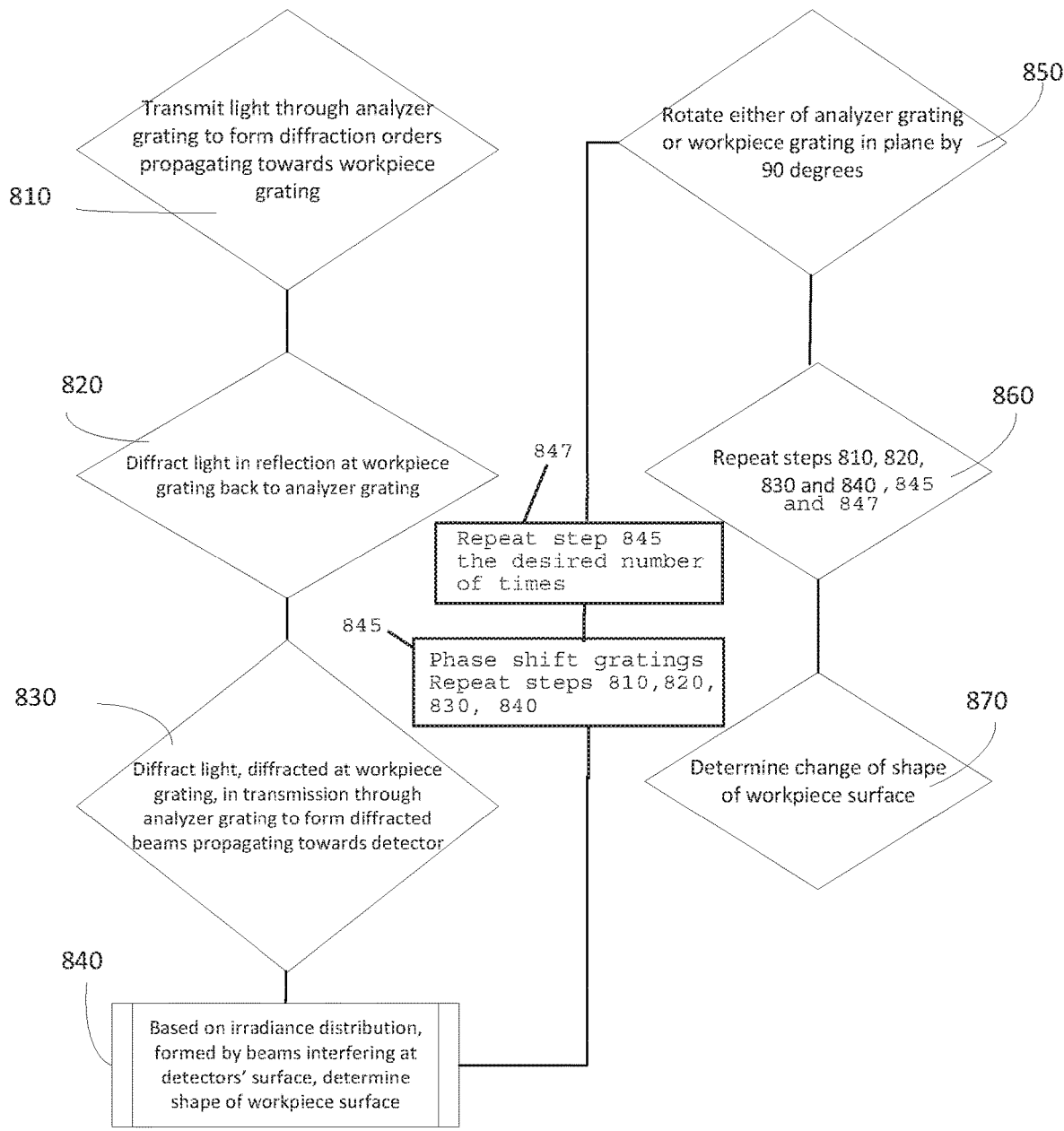
FIG. 8 is a flow-chart diagram representing the embodiment of the invention.

FIG. 8 provides a flow-chart diagram representing the embodiment of the method of the invention that includes steps 810, 820, 830, 840, 845, 847, 850, 860, and 870. More specifically, with reference to FIGS. 1 and 8, at step 810, transmit light through analyzer (reference) grating 104 to form diffraction orders 106A, 106B propagating towards workpiece grating 108. Next, at step 820, diffract light 113A, 113B in reflection at workpiece grating 108 is directed back to analyzer (reference) grating 104. Subsequently, at step 830, diffract light 113A,113B, diffracted at workpiece grating 108, in transmission through analyzer (reference) grating 104 to form diffracted beams 114A, 114B propagating towards detector 116. At step 840, based on irradiance distribution, formed by beams 114A, 114B interfering at the surface of the detector 116, an image is captured by the detector 116. Next, at step 845, the gratings 104, 108 are phase shift and another interference pattern image is captured with the detector. Subsequently, at step 847, step 845 is repeated for the desired number of phase shifts and a separate interference pattern image is captured at each phase shift. Next, at step 850, either the reference grating 104 or workpiece grating 108 is rotated in plane by 90 degrees. Subsequently, at step 860, steps 810, 820, 830, 840, 845, and 847 are repeated. Finally, at step 870, interference pattern images are evaluated to determine shape of the workpiece surface 110.

Figure 9:
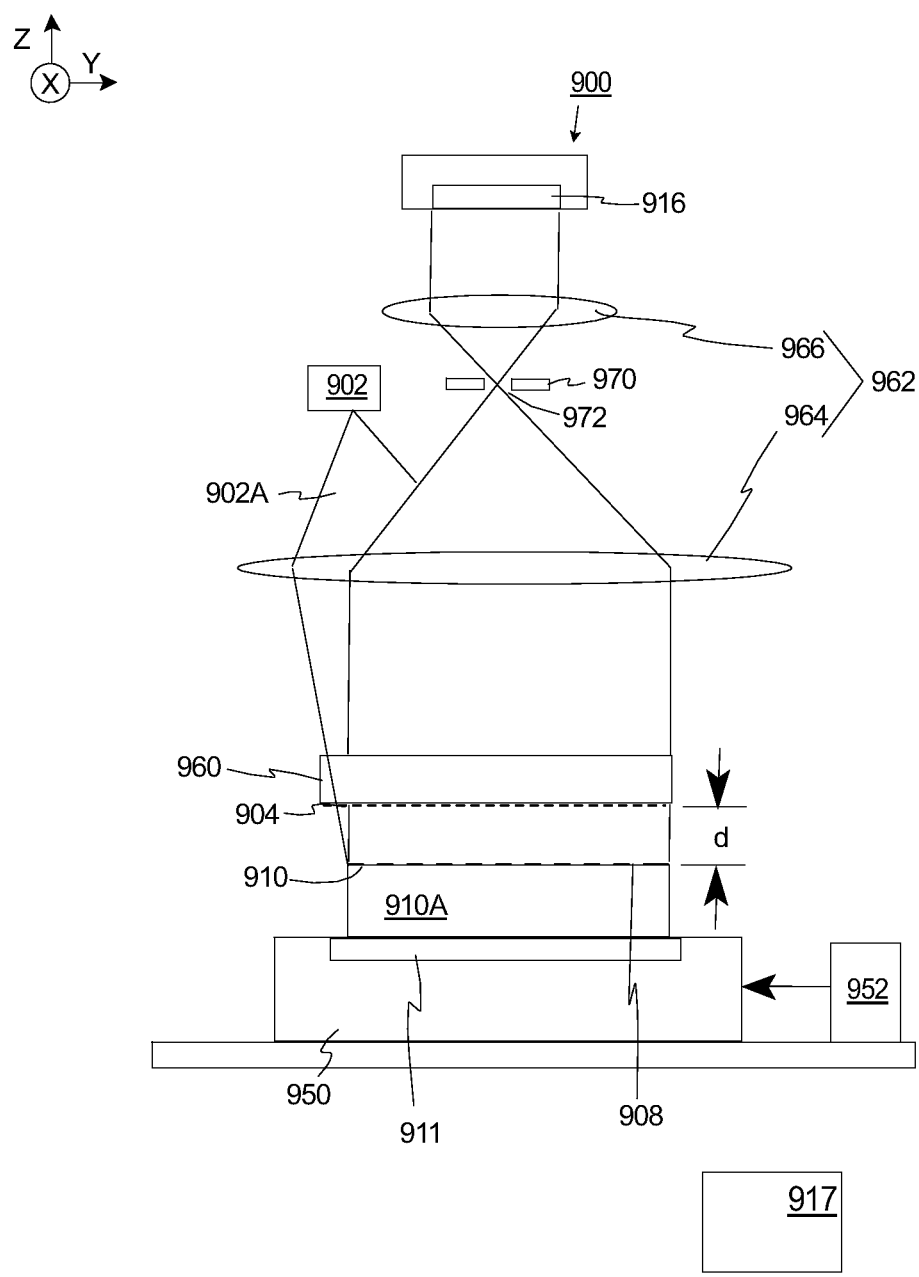
FIG. 9 is a schematic diagram of another measurement system structured according to the idea of the invention.

FIG. 9 illustrates another embodiment of a measurement system 900 that includes a light source 902, a reference grating 904, a workpiece grating 908, a detector 916, a stage 950, a stage mover 952, a processor 917, and a chuck 911 that are somewhat similar to the corresponding components described above and illustrated in FIG. 1. In FIG. 9, the measurement system 900 can be used to measure in-plane distortion of a target surface 910 of a workpiece 910A.

In FIG. 9, the reference diffraction grating 904 is configured to operate in transmission, and the workpiece diffraction grating 908, configured to operate in reflection, are disposed in a parallel and spaced-apart relationship. In this embodiment, the reference grating 904 may be formed on a surface of an optically-transparent member 960 (which, in a specific implementation may be shaped as a wedge; not shown). The workpiece grating 908 is associated and in a mechanical cooperation with the workpiece 910A that is subject to measurement (for example, a semiconductor wafer). In one embodiment, the workpiece grating 908 is affixed to (or integrated into) the target surface 910 of the workpiece 910A. Further, in certain embodiments, the workpiece grating 908 can cover the entire or substantially the entire target surface 910.

Additionally, in FIG. 9, the measurement system 900 can include an optical system 962 that includes one or more lenses 964, 966 (two are illustrated in FIG. 9) that direct the light at the detector 916 and form an image of the interference pattern on the detector 962. The optical system 962 relays the image at the workpiece grating 908 to the optical detector 916.

Moreover, the measurement system 900 can include a spatial filter 970 that defines a filter aperture 972. In this embodiment, the spatial filter 970 can be used to block unwanted stray light from reaching the detector 916 and adversely influencing the images. In this embodiment, the spatial filter 970 is positioned at a pupil plane of the optical system 962 between workpiece grating 908 and the optical detector 916. Since all of the beams coming from the pair of gratings (104, 108 in FIG. 1) or (904, 908 in FIG. 9) are essentially plane waves, they focus to points in the pupil, the locations of which depend on their angles. This allows beams at different enough angles to be spatially filtered.

In FIG. 9, the refraction gratings 904, 908 can be similar to the corresponding components described above and illustrated in FIG. 1. For example, the reference grating 904 can be a 1D grating and the workpiece grating 908 can be a 2D grating. Alternatively, the reference grating 904 can be a 2D grating and the workpiece grating 908 can be a 1D grating. Still alternatively, each grating 904, 908 can be a 2D grating.

In FIG. 9, the pitch of the reference grating 104 is different from the pitch of the workpiece grating 108. In FIG. 9, the pitch ratio of the gratings 904, 908 is one to two, with the pitch of the reference grating 904 being one half as large as the pitch of the workpiece grating 908. Stated in another fashion, the workpiece diffraction grating 908 has a first period, the reference diffraction grating 904 has a second period, and the first period is substantially twice as big as the second period. It should be noted that other pitch ratios are possible. For example, it can be useful to intentionally deviate slightly from the 1:2 ratio to create a fringe pattern. As an example, slight deviations from the 1:2 ratio of up to one percent can be tolerated.

Additionally, in the embodiment illustrated in FIG. 9, the light 902A is directed at the reference grating 904 at an oblique angle of incidence. As non-exclusive examples, the light 902A can be directed at the reference grating 904 at an angle of incidence of between thirty to sixty degrees relative to normal of the reference grating 904.

Figure 10:
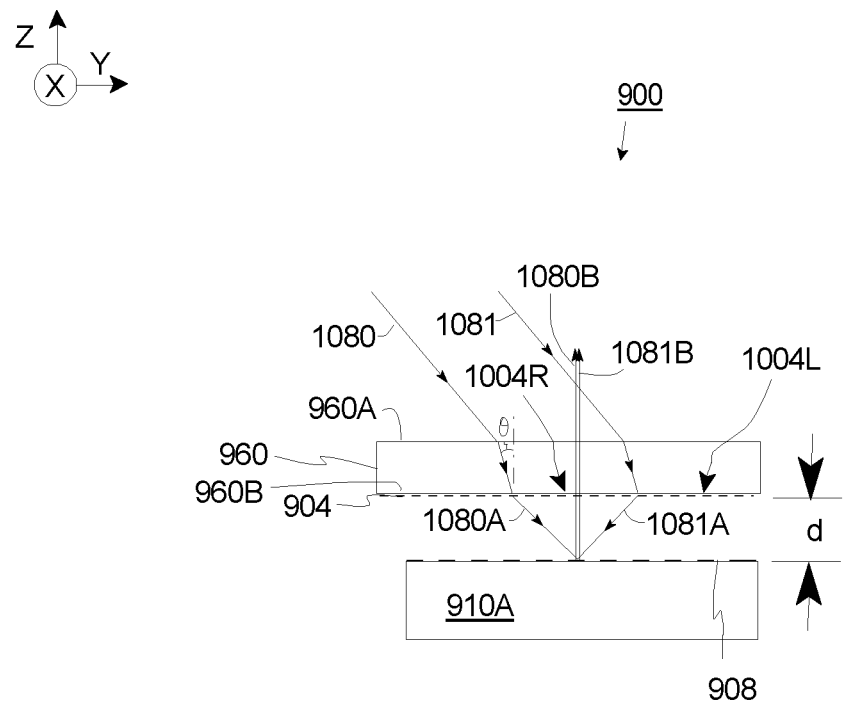
FIG. 10 is a schematic diagram of a portion of the measurement system of FIG. 9.

FIG. 10 is an enlarged view of a portion of the measurement system 900 of FIG. 9. In FIG. 10, a couple of light rays 1080, 1081 of the measurement beam are traced through the optically transparent member 960, through the reference grating 904, reflected off the workpiece grating 908 on the workpiece 910A, and through the reference grating 904 and the optically transparent member 960. As shown, the light rays 1080, 1081 and/or the measurement beam as a whole impinge onto the reference grating 904 to cover an illumination area 1004R that collectively covers a plurality of reference grating groups 1004L.

In this embodiment, the light rays 1080, 1081 are directed from the light source 902 (illustrated in FIG. 9) towards the transparent member 960 and the reference grating 904 such as to irradiate it at an oblique angle of incidence 8 relative to normal. As shown, the beams 1080, 1082 may represent the normals to the same optical wavefront or two different normals associated, respectively, with two different optical wavefronts. In the latter case, a phase delay may be introduced between the beams 1080, 1081 prior to their being incident on the transparent member 960. For example, the light source 902 can be used to introduce the time delay.

The opto-geometrical parameters of the reference grating 904 and transparent member 960 (if present) are chosen such that (i) the light 1080 passes through the transparent member 960 and the reference grating 904 as a zero order transmission beam 1080A that is directed at the workpiece grating 908; and (ii) the light 1081 passes through the transparent member 960 and is diffracted at the reference grating 904 as a −1 order diffracted beam 1081A that is directed at the workpiece grating 908.

Subsequently, the zero order transmission beam 1080A and the −1 order diffracted beam 1081A which are incident on the workpiece grating 908 are reflected off the workpiece grating 908 as diffracted beams 1080B, 1081B that are directed at the reference grating 904 and the transparent member 960, and subsequently to the optical system 960 (illustrated in FIG. 9) and the detector 916 (illustrated in FIG. 9). In this embodiment, the diffracted beams 1080B, 1081B are directed in a co-linear fashion towards the optical detector 916 (disposed in electrical communication with an optical data acquisition system). The optical detector 916 receives a spatial light distribution formed as a result of interference between the beams 1080B, 1081B and generates the generated electrical signal that represents the in-plane change of a geometrical characteristic of the workpiece 910A (such as an in-plane change of a position of the workpiece 910A, or an in-plane change in shape or form of the workpiece 910A, for example) while being, at the same time, devoid of information representing the out-of-plane change of a geometrical characteristic of the substrate. The data acquisition system (needs number) or unit further extracts the data representing the in-plane distortion of the workpiece 910A from such electrical signal.

It is understood that, ideally and in a specific non-limiting embodiment, all other diffraction orders associated with the illuminating beam(s) 1080, 1081 are evanescent so that they do not contribute to the stray light. The angle 0 of illumination of the transmitting reference grating 904 (and zero-order diffracted beam formed at that grating) and the pitch values of the gratings 904, 908 are chosen so that the beam(s) 1080B, 1081B from the reflective workpiece grating 908 are diffracted normal to the workpiece grating 908. This implies, as indicated in the sketch, that in such specific a case the pitch of the reference grating 904 is half that of the pitch of the reflective workpiece grating 908. The system is further configured such that the zero-order of diffraction formed at the grating 914 is collected and relayed to the detector 916 by additional optics (not shown).

The two beams 1080B, 1081B diffracted by the reflective workpiece grating 908 from the same point receive opposite phases due to any distortion occurring at or on the workpiece grating 908 and, therefore, due to any distortion associated with the workpiece 910A to which the workpiece grating 908 is rigidly affixed. Therefore, the distortion of the workpiece grating 908 causes an interferogram at the detector 916 (as a result of interference between the beams 1080B, 1081B) the phase of which is in proportion to the magnitude of such distortion (or change in the position of the workpiece grating 908 with respect to the beams 1080B, 1081B) at each point. Data-analysis of the interference phase is further implemented by shifting one of the gratings 904, 908 in incremental fashion increments (either phase-stepping or integrating-bucket style) to obtains incremental changes of phase shift and further by modulating the interference fringes acquired by the detector 916.

While it is possible, of course, to alternatively base the determination of in-plane distortions of the workpiece grating on assessing light distribution that has been interferometrically formed by diffraction orders (originated from the wafer-stage grating under the condition of normal incident of light onto the analysis grating) as illustrated in FIG. 1, such alternative implementation may not be necessarily preferred. Indeed, as would be understood by a skilled person, the measurement points are not in the same position in FIG. 1, so that a signal related to out-of-plane shape/topography remains present in the interference of the two output beams, inevitably contaminating the useful signal. Furthermore, stray light formed by multiple reflections of the present optical surfaces remains in the system (many stray light paths that are parallel to the measurement paths) and is captured by the optical detector, which leads to low contrast (and coherent noise if the source coherence length is not sufficiently short) of the useful signal.

Certain advantages of the approach described in reference to FIG. 9, on the other hand, is that (i) the out-of-plane changes if the shape of the reflective workpiece grating 908 shape do not (at least to the first order) impact the measurements—that is, the determination of the in-plane distortions of the workpiece grating 908 is substantially decoupled from the out-of plane distributions, and that (ii) the presence of the stray light within the system is substantially reduced, which means the useful signal contrast is increased.

In FIG. 10, the transparent member 960 includes an upper member surface 960A and an opposed lower member surface 960B. In the non-exclusive embodiment illustrated in FIG. 10, the lower member surface retains the reference grating 904. It should be noted that the upper member surface 960A and the lower member surface 960B can be referred to as a first surface or a second surface.

In one embodiment, the member surfaces 960A, 960B are parallel and the transparent member 960 is a plane parallel plate. Alternatively, the transparent member 960 can be wedged shaped. In this embodiment, the member surfaces 960A, 960B can be close but not parallel. For example, the member surfaces 960A, 960B can be at least one milliradian from being parallel. With this design, some of the stray light will be blocked by the spatial filter and not be directed to the optical detector 916.

Additionally, the gratings 904, 908 can be rotated slightly (e.g. one arcminute to one degree) relative to each other to inhibit stray light from being directed to the optical detector 916.

Moreover, it should be noted that in the embodiment illustrated in FIG. 10 that the beams 1080, 1081 have different path lengths between the light source 902 (illustrated in FIG. 9) and the optical detector 916 (illustrated in FIG. 9). In certain embodiments, the light source 902 can be designed to extend the path length of the beam 1080 so that it is equal to the path length of beam 1081.

Figure 11:
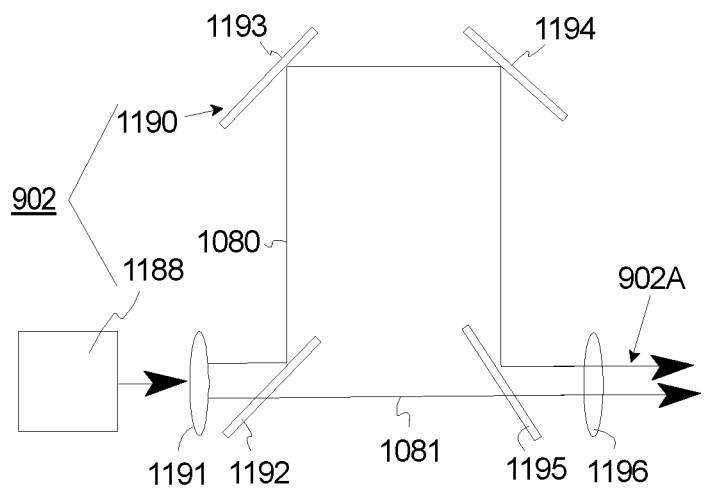
FIG. 11 is a simplified view of a light source that can be used in the measurement system of FIG. 9.

FIG. 11 illustrates that the light source 902 can include (i) a beam generator 1188, and (ii) a beam length adjuster 1190 (time delay system) that includes a collimating lens 1191, a first beam splitter 1192, a pair of mirrors 1193, 1194, a second beam splitter 1195, and a diverger lens 1196 that cooperate to generate the measurement beam 902A. In this embodiment, (i) the beam 1081 passes straight through each beam splitter 1192, 1195, and (ii) the beam 1080 is directed by the first beam splitter 1192 at the pair of mirrors 1193, 1194 and by the second beam splitter 1195 to be combined with the beam 1081. In this design the two mirrors 1193, 1194 can be moved up and down as necessary to change the optical path of the beam 1080 and adjust the time delay. With this design, the path of the beam 1080 has a controllable time delay relative to the beam 1081.

To measure the spatial distortion of a workpiece, comparative example has been consistently utilizing a combination of two, two-dimensional (2D) diffraction gratings—one being on or in direct association with a measured workpiece, and another disposed in front of the workpiece. An example of such an approach is provided by use of a transmissive 2D grating (for example, one formed on a glass substrate), through which the measurement beam of light is directed to diffract before impinging onto a 2D grating formed on a surface of a semiconductor substrate that is clamped on to a support (such as a vacuum chuck). Light incident onto the first 2D grating (referred to as a reference grating) diffracts, in transmission, towards the second 2D grating (referred to as an object grating), and then diffracts again—this time in reflection towards the reference grating. Upon a second (reverse) transmission through the reference grating, this now thrice-diffracted light is received by an optical detection system configured to determine a complex form of optical interference at the surface of an optical detector.

The pattern of the resulting interference pattern is known to be complex and to create several problems, both in measurement and in assessment of the results of the measurement at the data-processing step. For example, Eq. (1) is shown in FIG. 7 to represent a complex analytical expression representing the irradiance distribution formed, as a result of the conventionally-used approach, at the surface of the detector. In some cases, to properly represent the irradiation on the surface of the optical detector, 25 or more analytical terms are required, which include various and complex combinations of the −1, 0, and +1 diffraction orders. A person skilled in the art would readily recognize that accurate simulation of the 4-beam, 8-beam, and 16-beam diffraction becomes progressively difficult and imprecise. It is easy to make a mistake in the calculations of this complexity, and the accuracy of the result is further diminished because additional required terms may be simply omitted.

When the amount of spatial distortions of the shape of a workpiece being measured is minute—for example, on a scale of a nanometer or less—the shortcomings and inaccuracies of the conventional methods of determining such distortions can no longer be overlooked or neglected. For example, it was empirically determined that the conventional use of a combination of the 2D gratings (as discussed above) does not allow for accurate measurement of sub-nanometer changes in the in-plane shape of a semiconductor wafer caused by changes of the ambient conditions, such as temperature or stress-induced changes caused by, for example, vacuum holding of the wafer. To satisfy this need, a different approach is required.

A typical lithographic exposure tool equipped with a wafer stage, carrying a semiconductor wafer (that is attached to the stage and that is being irradiated with light from a chosen light source to project a geometrical pattern in a photosensitive resist layer on the wafer), can also include a reflective stage grating. The purpose of this so-called "stage grating" is to facilitate the measurements of the position and/or orientation of the wafer-stage (and, therefore, the wafer itself) to ensure that the patterning of the wafer during the exposure process is dimensionally and positionally correct (that is—according to the design). To achieve this goal, the stage grating is conventionally used in conjunction with an encoder head—the optical system that relies on and utilizes light diffracted by the stage grating for forming judiciously-defined interferometric distributions of light from the results of characterization of which the sought-after position and/or orientation of the wafer is further determined.

Understandably then, the distortions of the surface of the wafer, no matter a source of such distortions, affect the accuracy of the location of where the patterns are transferred to the wafer. A person of skill understands, therefore, that there remains a need in a solution that improves the accuracy of assessing the distortion(s) introduced by the wafer-holding mechanism.

Implementations of the present embodiment address a need to measure geometrical distortion of a workpiece (such as a semiconductor wafer, for example) by providing methods that result in higher light efficiency as compared to methods of the prior art while reducing the complexity of processing of data, which represent interferometrically-formed distribution of irradiance across the surface of an optical detector, thereby offering simpler operations and better measurement performance overall.

In particular, the problem of measuring a 2D, in-plane distortion of a workpiece (in one case, a semiconductor wafer) on a sub-nanometer scale is solved, in one embodiment, by complementing the 2D workpiece grating associated with the workpiece with an analyzer grating (reference grating) configured as a 1D grating (instead of the 2D reference grating as done in comparative example) to simplify the overall measurement of the shape of the workpiece. After the workpiece shape has been measured in one direction (referred to, for simplicity as a first direction extending, for example, along the x-axis), one of the two diffraction gratings is rotated with respect to another in the plane of such grating to carry out a similar measurement along another, second axis that is transverse to the first axis. (In one specific case, such rotation can include an in-plane rotation of the workpiece surface carrying the 2D workpiece grating by 90 degrees; in another specific case, such rotation can include an in-plane rotation of the 1D reference grating by 90 degrees with respect to the workpiece.) It would be appreciated that care should be taken to not disturb or change the existing distortion of the workpiece during such rotation. As a result, the characterization of the shape of the workpiece along the two axes transverse to one another is accomplished.

The distortion of the shape of the workpiece is then determined by repeating such aggregate measurement under the conditions that could have or did change the shape, for example, at a different moment in time and/or in a different ambient condition (for example, at a different temperature or atmospheric pressure, or after the wafer has been transferred from one wafer chuck (on one wafer stage) to a second wafer chuck (on a second wafer stage)). The difference between the results of the two aggregate measurements is indicative of the value(s) of geometrical distortion of the workpiece that has occurred between the two aggregate measurements.

The first step of the proposed aggregate measurement is directed only to measuring the workpiece shape along a first axis, while the second step is directed to measuring the workpiece shape only along a second axis that is transverse to the first axis. In advantageous contradistinction with comparative example, however, the overall number of diffraction orders forming the interferometric distribution of irradiance on the optical detector is substantially reduced, as only two (in certain embodiments) diffraction orders are created at the reference grating at each step of the measurement.

The detailed description presented below uses a non-limiting example of the 1D grating being a reference (analyzer) grating. The use of the 1D grating provides better diffraction efficiency leading to improved signal contrast and measurement performance. It also reduces the number of diffracted beams that interfere at each detector pixel. This reduction in interference complexity makes the detected interference pattern easier to simulate and understand while, at the same time, removing measurement artifacts from the optical data. The use of the 1D reference grating, therefore, ensures results with precision and accuracy not achievable by the measurements of the comparative example.

What is claimed is:

1. A measurement system for use in measurements of in-plane distortions of a workpiece diffraction grating that is configured to diffract light in reflection, the measurement system comprising:
   an optical detector;
   a reference diffraction grating that is spaced apart from the workpiece diffraction grating, the reference diffraction grating being configured to diffract light in transmission; and
   a light source that directs a measurement beam at the reference diffraction grating;
   wherein the measurement beam directed at the reference diffraction grating is (i) diffracted and transmitted through the reference grating and directed at the workpiece diffraction grating, (ii) subsequently diffracted and reflected off of the workpiece diffraction grating and directed at the reference diffraction grating, and (iii) then subsequently transmitted through the reference grating as diffracted output beams and directed at the optical detector; and
   wherein the optical detector acquires the output beams to generate an interference image having a spatial light distribution with a phase that is used to determine in plane distortions of the workpiece diffraction grating.

2. The measurement system of claim 1 wherein the reference diffraction grating is a one dimensional diffraction grating and the workpiece diffraction grating is a two dimensional diffraction grating.

3. The measurement system of claim 1 wherein the reference diffraction grating is a two dimensional diffraction grating and the workpiece diffraction grating is a one dimensional diffraction grating.

4. The measurement system of claim 1 wherein the reference diffraction grating has a larger pitch than the workpiece diffraction grating.

5. The measurement system of claim 4 wherein a pitch ratio of the reference diffraction grating and the workpiece diffraction grating is approximately two to one.

6. The measurement system of claim 1 wherein the reference diffraction grating has a pitch that is different than a pitch of the workpiece diffraction grating.

7. The measurement system of claim 1 wherein the measurement beam has a normal incidence on the reference diffraction grating.

8. The measurement system of claim 1 wherein the measurement beam has an oblique incidence on the reference diffraction grating, and wherein light is reflected off of the workpiece diffraction grating normal to the workpiece diffraction grating.

9. The measurement system of claim 8 further comprising an optically transparent member that retains the reference refractive grating.

10. The measurement system of claim 9 wherein the optically transparent member includes a first member surface and an opposed second member surface, and wherein the member surfaces are not parallel.

11. The measurement system of claim 1 further comprising a mover that moves one of the diffraction gratings relative to the other diffraction grating.

12. The measurement system of claim 11 wherein the mover rotates one of the diffraction gratings relative to the other diffraction grating.

13. The measurement system of claim 1 wherein the interference image is generated as a result of interference between the output beams; and wherein the spatial light distribution defined as a result of the interference between the output beams is acquired by the optical detector to produce data representing the in-plane distortions of the workpiece.

14. The measurement system of claim 13 wherein the spatial light distribution is substantially insensitive to an out-of-plane distortion of the workpiece.

15. A measurement system for use in measurements of in-plane distortions of a workpiece diffraction grating of a workpiece, the workpiece diffraction grating being configured to diffract light in reflection, the measurement system comprising:
   an optical detector;
   a reference diffraction grating that is positioned spaced apart from the workpiece diffraction grating, the reference diffraction grating being configured to diffract light in transmission;
   a light source that directs a measurement beam at the reference diffraction grating;
   wherein the measurement beam directed at the reference diffraction grating is (i) diffracted and transmitted through the reference grating and directed at the workpiece diffraction grating, (ii) subsequently diffracted and reflected off of the workpiece diffraction grating and directed at the reference diffraction grating, and (iii) then subsequently transmitted through the reference grating as diffracted output beams and directed at the optical detector, the optical detector acquiring the output beams to generate an interference image having a spatial light distribution with a phase; and
   a processor that evaluates the interference image from the optical detector to determine in plane distortions of the workpiece diffraction grating.

16. The measurement system of claim 15 wherein the reference diffraction grating is substantially parallel to the workpiece diffraction grating.

17. The measurement system of claim 15 wherein the workpiece diffraction grating has a first period, and the reference diffraction grating has a second period that is different from the first period.

18. The measurement system of claim 15 wherein the light source directs the measurement beam to impinge onto the reference diffraction grating at an oblique angle of incidence.

19. The measurement system of claim 18, wherein the reference diffraction grating is configured to produce a 1st order of diffraction from the measurement beam impinging onto the reference diffraction grating at the oblique angle of incidence.

20. The measurement system of claim 19 wherein the workpiece diffraction grating is configured to form secondary diffracted beams from the light incident thereon, wherein the secondary diffracted beams represent zeroth, and $1^{st}$ order of diffraction.

21. The measurement system of claim 15 wherein the workpiece diffraction grating is configured to direct diffracted light towards the reference diffraction grating.

22. The measurement system of claim 15 wherein the output beams acquired by the optical detector have been diffracted twice by the reference diffraction grating and once by the workpiece grating.

23. The measurement system of claim 15 wherein the workpiece diffraction grating is defined on a surface of a workpiece.

24. The measurement system of claim 15 wherein the spatial light distribution is substantially insensitive to an out-of-plane distortion of the workpiece.

\* \* \* \* \*